United States Patent
Trika (10) Patent No.: US 11,461,036 B2
(45) Date of Patent: Oct. 4, 2022

(54) TECHNOLOGIES FOR LOGGING AND VISUALIZING STORAGE EVENTS

(71) Applicant: Intel Corporation, Santa Clara, CA (US)

(72) Inventor: Sanjeev Trika, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/142,377

(22) Filed: Sep. 26, 2018

(65) Prior Publication Data

US 2019/0042143 A1  Feb. 7, 2019

(51) Int. Cl.
| | |
|---|---|
| *G06F 3/06* | (2006.01) |
| *G06F 11/34* | (2006.01) |
| *G06F 11/30* | (2006.01) |
| *G06F 11/32* | (2006.01) |

(52) U.S. Cl.
CPC .......... *G06F 3/0653* (2013.01); *G06F 3/0604* (2013.01); *G06F 3/0673* (2013.01); *G06F 11/3034* (2013.01); *G06F 11/323* (2013.01); *G06F 11/3452* (2013.01); *G06F 11/3476* (2013.01); *G06F 11/3495* (2013.01)

(58) Field of Classification Search
CPC .... G06F 3/0653; G06F 3/0604; G06F 3/0673; G06F 11/3034; G06F 11/323; G06F 11/3452; G06F 11/3476; G06F 11/3495
See application file for complete search history.

(56) References Cited

U.S. PATENT DOCUMENTS

| | | | |
|---|---|---|---|
| 10,756,990 B1 * | 8/2020 | Chakkassery Vidyadharan .......... G06F 11/3419 |
| 2004/0153844 A1 * | 8/2004 | Ghose ................... H04L 41/064 714/42 |
| 2009/0282096 A1 * | 11/2009 | Kamrowski ........ H04L 67/1095 709/224 |
| 2010/0265937 A1 * | 10/2010 | Frantz ............... H04W 56/0085 370/350 |
| 2015/0019913 A1 * | 1/2015 | Singh .................. H04L 41/0631 714/37 |

OTHER PUBLICATIONS

IBM Director—IBM Flex System Manager Systems Management Guide, Version 1.3.2, Fourth Edition, Dec. 2014 (Year: 2014).*

* cited by examiner

*Primary Examiner* — William E. Baughman
*Assistant Examiner* — Janice M. Girouard
(74) *Attorney, Agent, or Firm* — Compass IP Law, PC (57) ABSTRACT

Technologies for logging and visualizing trace capture data in a data storage subsystem (e.g., storage application layers and data storage devices of a compute device) are disclosed herein. One or more storage events in the data storage subsystem are captured for a specified time period. Statistics are determined from the captured storage events. A visualization of the storage events and statistics for the specified time period is generated.

20 Claims, 8 Drawing Sheets

TECHNOLOGIES FOR LOGGING AND VISUALIZING STORAGE EVENTS

BACKGROUND

A data storage device may experience various performance issues in operation. For example, under some conditions, the data storage device may have relatively low throughput during some time periods, such as in instances in which multiple workloads access the data storage device in a given moment. Another performance issue that may arise is input/output (I/O) latency, in which a requested I/O operation is completed in a greater amount of time than expected. Performance issues in data storage devices may negatively impact quality of service (QoS) metrics specified by users as well as impact overall performance of a system hosting the data storage devices. Further, these performance issues may also originate from the storage application layers associated with the storage device hardware and software storage stack providing access to the data storage devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
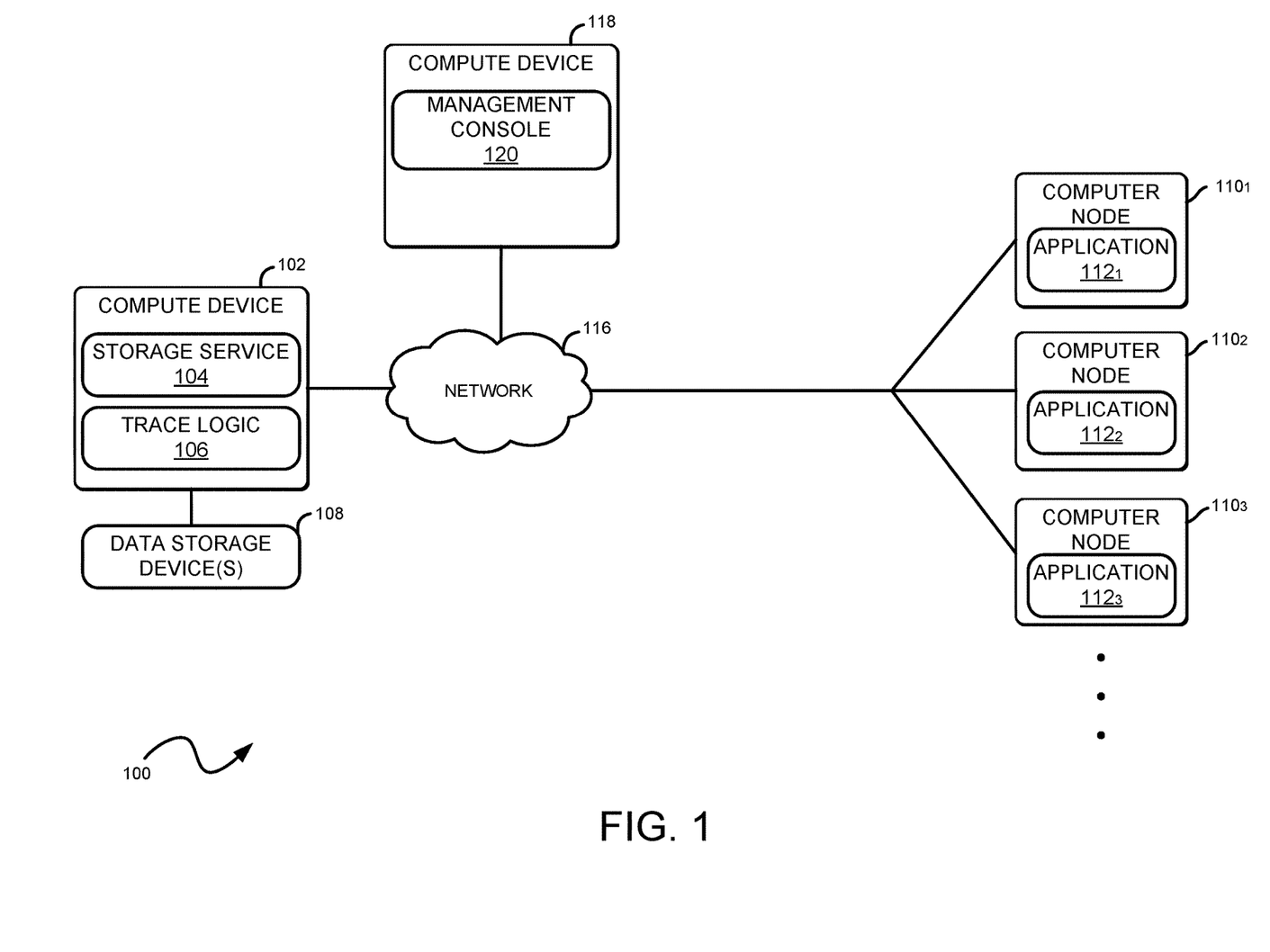
FIG. 1 is a simplified block diagram of at least one embodiment of an example computing environment in which storage events of a storage system are recorded and visualized.

Referring now to FIG. 1, a computing environment 100 in which storage events of a storage system are recorded and visualized is shown. As shown, the computing environment 100 includes a compute device 102 connected via a network 116 to multiple computer nodes $110_{1-3}$. In some embodiments, the computing environment 100 may be indicative of a data center in which multiple workloads (e.g., applications $112_{1-3}$) hosted on various computing devices (e.g., computer nodes 110) access storage resources of a system, such as the compute device 102. Each of the applications $112_{1-3}$ may be associated with a distinct tenant (e.g., one or more users that share access with specified privileges to the given application 112). In another example embodiment, the computing environment 100 may be indicative of a cloud computing environment in which the physical storage resources are provided in a virtualization setting.

In some embodiments, the compute device 102 includes a storage service 104 and one or more data storage devices 108 (e.g., solid state drives (SSDs)). The storage service 104 provides a communication interface for the applications 112 in accessing storage resources in the data storage device 108. For example, the applications 112 may send read and write access operation requests to the storage service 104. The storage service 104 may forward the requests to the data storage device 108, which in turn carries out the corresponding operations. In an embodiment, the storage service 104 may be embodied as a software application stack having multiple layers (also referred to herein as "storage application layers"). Each layer may correspond to various levels of the software application stack, such as an application interface level, file-system level, driver level, physical and logical block address mappings, etc. The storage application layers and the data storage devices 108 may form a data storage subsystem of the compute device 102.

Further, a compute device 118, which is also connected over the network 116, may include a management console 120 to configure and maintain the data storage subsystem. Further, the management console 120 may also receive data (e.g., storage metrics) from applications executing in the compute device 102, such as the storage service 104. The management console 120 may provide a graphical user interface that allows a user (e.g., an administrator) to manage the storage service 104 and the data storage devices 108. For example, the administrator may enable or disable data storage devices 108, add new storage devices 108, configure partitions for workloads associated with distinct tenants accessing the data storage devices 108, and the like.

While FIG. 1 depicts the management console 120 as executing in a remote compute device 118, one of skill in the art will recognize that the management console 120 can also be included as part of the compute device 102. Further, in some embodiments, the applications $112_{1-3}$ may execute on the compute device 102 instead of (or in addition to) the respective compute nodes $110_{1-3}$, e.g., in the event that the compute device 102 is a desktop computer.

As further described herein, embodiments disclose techniques for capturing and visualizing storage events occurring in the data storage subsystem. Doing so allows the compute device 102 to identify performance issues originating in any level relating to the storage application layers and in the data storage devices 108. Doing so also allows the compute device 102 to present data relating to the performance issues in a relatively readable manner In an embodiment, the compute device 102 provides a trace logic 106 configured to record storage events (e.g., read and write accesses, storage requests and operations, etc.) and the like for a given period of time. The trace logic 106 may determine statistics associated with the storage events, such as throughput, I/Os per second (IOPS), and latency. Thereafter, the trace logic 106 may generate one or more visualizations of the storage events and statistics, e.g., presenting desired layers and devices along one another relative to time.

Advantageously, the trace logic 106 simultaneously logs, in a time-synchronized manner, operations at each participating storage application layer and also operations occurring within a participating data storage device 108. As a result, host-triggered operations (e.g., host read operations and write operations by the storage service 104 corresponding to directed NAND reads and writes) and internally generated operations (e.g., read, write, and erase operations for defragmentation of the data storage device 108, I/O operations relating to backup and disaster recovery (BDR)) are captured in the logs. Further, the trace logic 106 visualizes storage events at each level in a time-synchronized manner, which allows for more granular analysis (e.g., to evaluate whether a set of storage events and corresponding statistics are conforming to a specified quality of service (QoS)). In addition, the visualization may allow for determining statistics for a given time-window at each storage application layer and data storage device 108. Doing so allows performance issues to be more easily identified (e.g., by a process used to dynamically manage the data storage devices 108 to correct the performance issues). For example, the trace logic 106 may transmit logging data to a hardware logic that evaluates the logging data to identify specified metrics relating to a performance issue (e.g., using threshold values for issues such as latency, throughput, and the like) and perform some corrective action. Advantageously, doing so may improve performance of components in the data storage subsystem.

Note, the present disclosure describes a computing environment that is connected with a network of computing nodes that transmit storage requests to data storage devices 108. Of course, one of skill in the art will recognize that embodiments disclosed herein may be adapted independently of the networked systems and can comprise an individual compute device configured with a data storage device.

Figure 2:
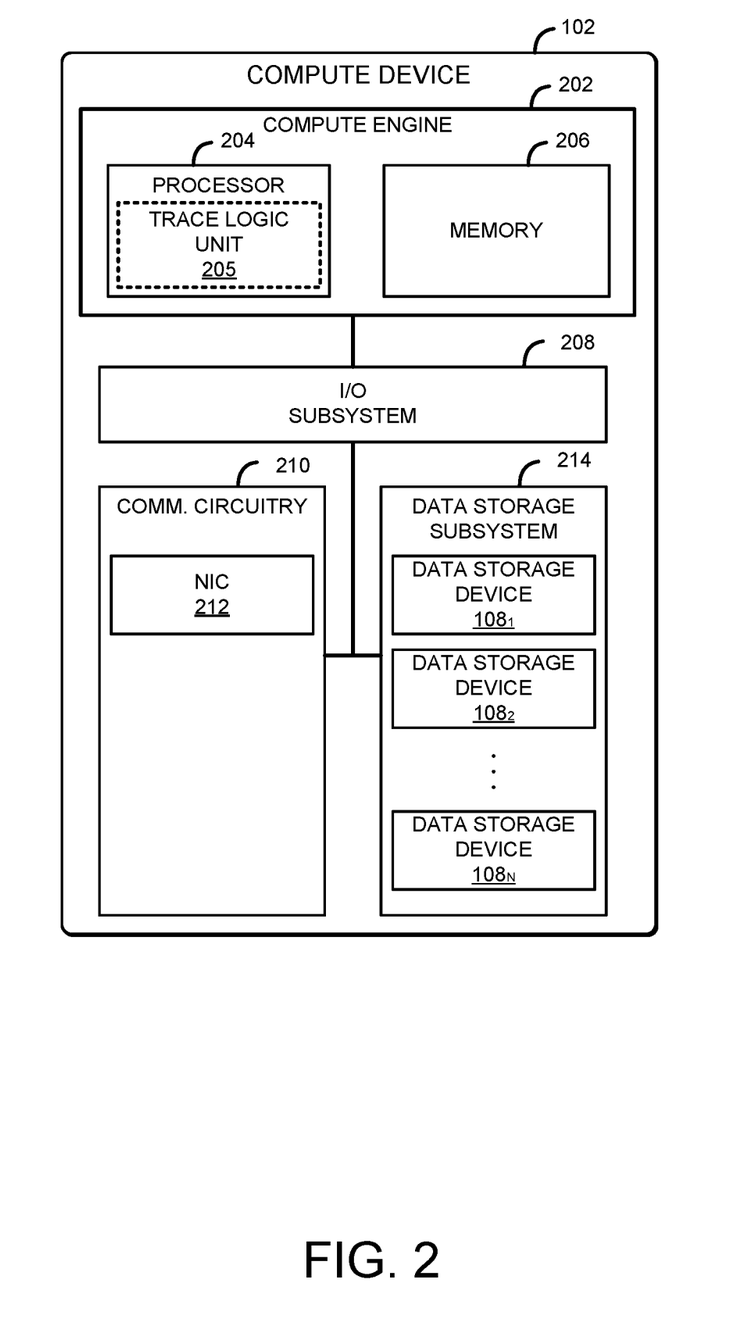
FIG. 2 is a simplified block diagram of at least one embodiment of the compute device described relative to FIG. 1.

Referring now to FIG. 2, the compute device 102 may be embodied as any type of device capable of performing the functions described herein, such as capturing one or more storage events in a data storage subsystem for a specified time period, determining one or more statistics from the captured storage events, and generating a visualization of the storage events and the statistics for the specified time period.

As shown, the illustrative compute device 102 includes a compute engine 202, an input/output (I/O) subsystem 208, communication circuitry 210, and a data storage subsystem 214. Of course, in other embodiments, the compute device 102 may include other or additional components, such as those commonly found in a computer (e.g., display, peripheral devices, etc.), such as peripheral devices. Additionally, in some embodiments, one or more of the illustrative components may be incorporated in, or otherwise form a portion of, another component.

The compute engine 202 may be embodied as any type of device or collection of devices capable of performing various compute functions described below. In some embodiments, the compute engine 202 may be embodied as a single device such as an integrated circuit, an embedded system, a field programmable gate array (FPGA), a system-on-a-chip (SOC), or other integrated system or device. Additionally, in some embodiments, the compute engine 202 includes or is embodied as a processor 204 and a memory 206. The processor 204 may be embodied as one or more processors, each processor being a type capable of performing the functions described herein. For example, the processor 204 may be embodied as a single or multi-core processor(s), a microcontroller, or other processor or processing/controlling circuit. In some embodiments, the processor 204 may be embodied as, include, or be coupled to an FPGA, an ASIC, reconfigurable hardware or hardware circuitry, or other specialized hardware to facilitate performance of the functions described herein. In the illustrative embodiment, the processor 204 includes trace logic unit 205, which may be embodied as any type of hardware (e.g., a co-processor, an integrated circuit, etc.) or software for communicating with application layers and storage devices of the data storage subsystem 214. For instance, the trace logic unit 205 may receive and process storage events data from the application layers and storage devices. Further, the trace logic unit 205 may generate visualizations from the storage events. Further still, the trace logic unit 205 may determine whether a visualization of the storage events matches a reference visualization indicative of a predefined performance issue. The trace logic unit 205 may perform, in response, a corrective action to address the performance issue (e.g., causing a data storage device 108 to adjust a buffer size, adjust an amount of data that is prefetched, adjusting a type of error correction code (ECC) used to read and write data, etc.). Doing so may reduce or eliminate the performance issues.

The memory 206 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 206 may be integrated into the processor 204.

The compute engine 202 is communicatively coupled with other components of the computing device 102 via the I/O subsystem 208, which may be embodied as circuitry and/or components to facilitate input/output operations with the compute engine 202 (e.g., with the processor 204 and/or the memory 206) and other components of the compute device 102. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 208 may form a portion of a system-on-a-chip (SoC) and be incorporated, along with one or more of the processor 204, the memory 206, and other components of the compute device 102, into the compute engine 202.

The communication circuitry 210 may be embodied as any communication circuit, device, or collection thereof, capable of enabling communications over a network between the compute device 102 and other devices (e.g., the computer nodes $110_{1-3}$). The communication circuitry 210 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 210 includes a network interface controller (NIC) 212, which may also be referred to as a host fabric interface (HFI). The NIC 212 may be embodied as one or more add-in-boards, daughtercards, controller chips, chipsets, or other devices that may be used by the compute device 102 for network communications with remote devices. For example, the NIC 212 may be embodied as an expansion card coupled to the I/O subsystem 208 over an expansion bus such as PCI Express.

The data storage subsystem 214 may be embodied as any type of devices configured for short-term or long-term storage of data, such as data storage devices $108_{1-N}$. Each data storage device $108_{1-N}$ may be embodied as memory devices and circuits, solid state drives (SSDs), memory cards, hard disk drives, or other data storage devices. The illustrative data storage devices $108_{1-N}$ are embodied as one or more SSDs. However, in other embodiments, a data storage device 108 may be embodied as or include any other memory devices. An example data storage device 108 is described further relative to FIG. 3.

Additionally or alternatively, the compute device 102 may include one or more peripheral devices. Such peripheral devices may include any type of peripheral device commonly found in a compute device such as a display, speakers, a mouse, a keyboard, and/or other input/output devices, interface devices, and/or other peripheral devices.

As noted, a storage request (e.g., a request to perform an I/O operation in a data storage device 108) may flow from various storage application layers prior to reaching a given data storage device 108. For example, intermediate layers such as a file-system layer, disk-caching layer, a RAID (Redundant Array of Independent Disks)/EC (Erasure Coding)-controller layer, networking logic layer, a compression or de-duplication layer, and the like may be incorporated as hardware or software-based layers in the various components of the compute device 102 (e.g., the compute engine 202, I/O subsystem 208, communication circuitry 210, data storage subsystem 214, etc.).

Figure 3:
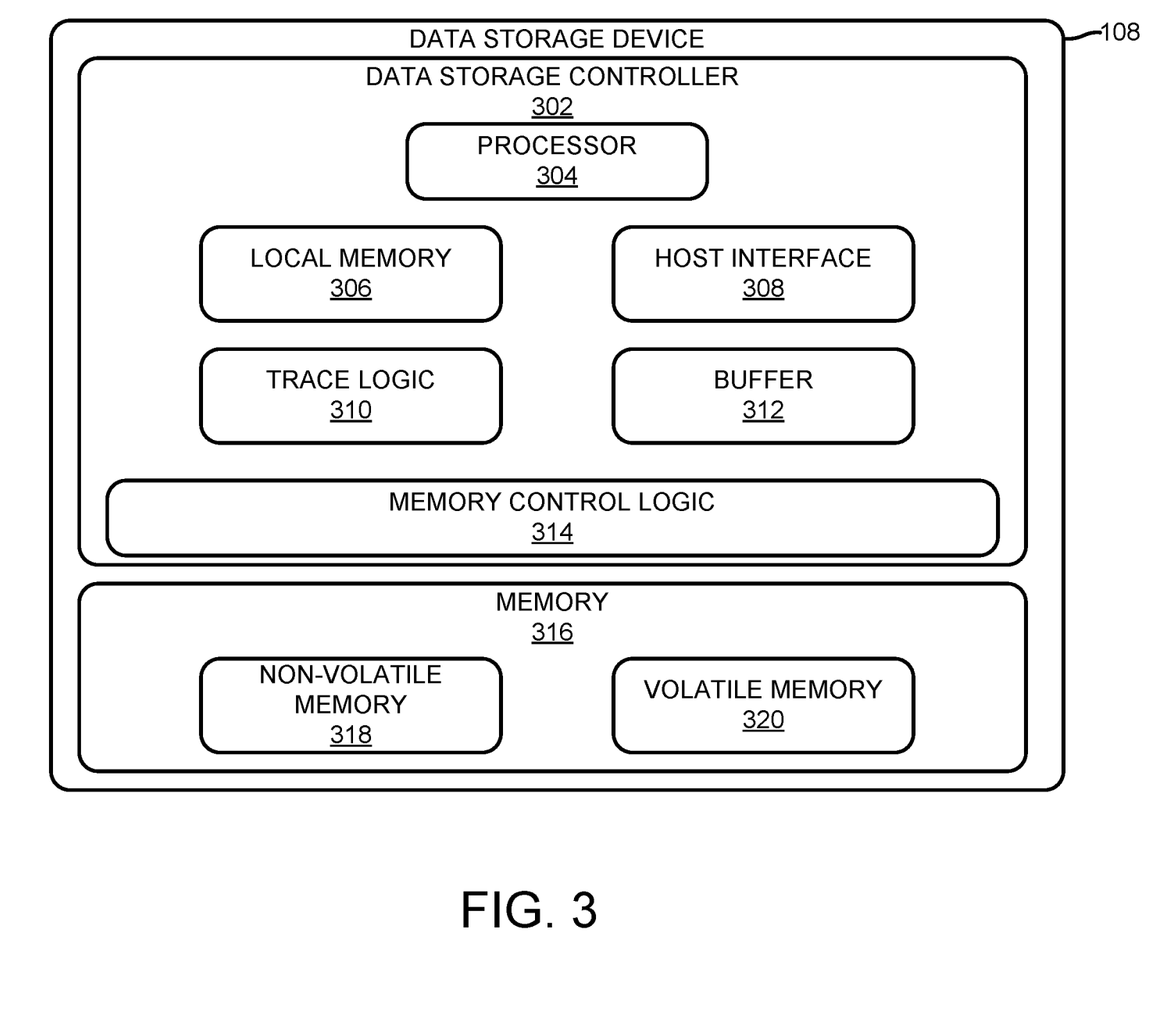
FIG. 3 is a simplified block diagram of at least one embodiment of an example data storage device described relative to FIG. 1.

Referring now to FIG. 3, in the illustrative embodiment, the data storage device 108 includes the data storage controller 302 and a memory 316, which illustratively includes a non-volatile memory 318 and a volatile memory 320. The data storage device 108 may be embodied as any type of device capable of storing data and performing the functions described herein. As stated, the data storage device 108 illustrated is embodied as an SSD but can be indicative of other types of data storage devices.

The data storage controller 302 may be embodied as any type of control device, circuitry or collection of hardware devices capable of recording storage events occurring therein and sending a log of the storage events to the compute device 102. In the illustrative embodiment, the data storage controller 108 includes a processor (or processing circuitry) 304, a local memory 306, a host interface 308, a trace logic 310, a buffer 312, and a memory control logic 314. The memory control logic 314 can be in the same die or integrated circuit as the processor 304 and the memory 306, 316. In some cases, the processor 304, memory control logic 314, and the memory 306, 316 can be implemented in a single die or integrated circuit. Of course, the data storage controller 302 may include additional devices, circuits, and/or components commonly found in a drive controller of an SSD in other embodiments.

The processor 304 may be embodied as any type of processor capable of performing the functions disclosed herein. For example, the processor 304 may be embodied as a single or multi-core processor(s), digital signal processor, microcontroller, or other processor or processing/controlling circuit. Similarly, the local memory 306 may be embodied as any type of volatile and/or non-volatile memory or data storage capable of performing the functions disclosed herein. In the illustrative embodiment, the local memory 306 stores firmware and/or instructions executable by the processor 304 to perform the described functions of the data storage controller 302. In some embodiments, the processor 304 and the local memory 306 may form a portion of a System-on-a-Chip (SoC) and be incorporated, along with other components of the data storage controller 302, onto a single integrated circuit chip.

The processor 304 may be embodied as any type of processor capable of performing the functions described herein. For example, the processor 304 may be embodied as a single or multi-core processor(s), digital signal processor, microcontroller, or other processor or processing/controlling circuit. Similarly, the local memory 306 may be embodied as any type of volatile and/or non-volatile memory or data storage capable of performing the functions described herein. In the illustrative embodiment, the local memory 306 stores firmware and/or other instructions executable by the processor 304 to perform the described functions of the data storage controller 302. In some embodiments, the processor 304 and the local memory 306 may form a portion of a System-on-a-Chip (SoC) and be incorporated, along with other components of the data storage controller 302, onto a single integrated circuit chip.

The host interface 308 may also be embodied as any type of hardware processor, processing circuitry, input/output circuitry, and/or collection of components capable of facilitating communication of the data storage device 108 with the compute device 102. That is, the host interface 308 embodies or establishes an interface for accessing data stored on the data storage device 108 (e.g., stored in the memory 316). To do so, the host interface 308 may be configured to use any suitable communication protocol and/or technology to facilitate communications with the data storage device 108 depending on the type of data storage device. For example, the host interface 308 may be configured to communicate with a host device or service using Serial Advanced Technology Attachment (SATA), Peripheral Component Interconnect express (PCIe), Serial Attached SCSI (SAS), Universal Serial Bus (USB), and/or other communication protocol and/or technology in some embodiments.

The trace logic 310 may be embodied as any device or circuitry (e.g., a processor, an integrated circuitry, etc.) capable of performing operations to record storage events and transmit storage events to the compute device 102 (e.g., to the trace logic 106). The trace logic 310 may receive discovery requests from the trace logic 106 over the host interface 308 to initialize the data storage device 108 for recording. The requests may include information such as a time stamp for synchronization and a polling frequency. The trace logic 310 may send an acknowledgment to the trace logic 106 indicating that the data storage device 108 may send storage event data when a capture is requested. Once initialized, the trace logic 310 may receive requests to capture data for a given time period (e.g., for an hour starting from a time stamp, for five minutes, for thirty milliseconds, etc.). The trace logic 310 may then capture events such as storage operations (e.g., read and write I/O accesses to memory 306, 316) and store the events in the buffer 312. The trace logic 310 may further capture operations associated with the storage operations, such as whether a given access is requested by the compute device 102, whether the storage operation is associated with a defragmentation, whether the storage operation is associated with a backup and disaster recovery operation, and the like. For example, a given data storage device (e.g., a NAND-based SSD) may perform defragmentation as a background process to remove stale data (e.g., data that has been unused for over a specified amount of time) to allow a given block to be overwritten. The defragmentation process may include a number of read and write operations that the trace logic 310 may capture and associate with a defragmentation operation. In an embodiment, the trace logic 310 may periodically receive polling requests for captured data (e.g., from the trace logic 106) and send the captured data stored in the buffer 312 in response. As further described herein, the trace logic 310 may do so via a discovery request to various storage application layers (e.g., over a PCIe link between the compute device 102 and the data storage device 108) configured to capture storage event data. In other embodiments, the trace logic 310 may periodically send the captured data to the trace logic 106 without receiving the polling requests. Further, the trace logic 310 may receive direction (e.g., control triggers and/or messages) from the compute device 102 to perform some corrective action to address performance issues in the data storage device 108 (e.g., adjusting parameters such as buffer size, prefetch data size, ECC types, and the like).

The buffer 312 of the data storage controller 302 is embodied as volatile memory used by data storage controller 108 to temporarily store data that is being read from or written to the memory 316, such as storage event data. The particular size of the buffer 312 may be dependent on the total storage size of the memory 316. The memory control logic 314 is illustratively embodied as hardware circuitry and/or device configured to control the read/write access to data at particular storage locations of memory 316.

The non-volatile memory 318 may be embodied as any type of data storage capable of storing data in a persistent manner (even if power is interrupted to non-volatile memory 318). For example, in the illustrative embodiment, the non-volatile memory 318 is embodied as one or more non-volatile memory devices. The non-volatile memory devices of the non-volatile memory 318 are illustratively embodied as quad level cell (QLC) NAND Flash memory. However, in other embodiments, the non-volatile memory 318 may be embodied as any combination of memory devices that use chalcogenide phase change material (e.g., chalcogenide glass), three-dimensional (3D) crosspoint memory, or other types of byte-addressable, write-in-place non-volatile memory, ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM.

The volatile memory 320 may be embodied as any type of data storage capable of storing data while power is supplied. For example, in the illustrative embodiment, the volatile memory 320 is embodied as one or more volatile memory devices, and is periodically referred to hereinafter as volatile memory 320 with the understanding that the volatile memory 320 may be embodied as other types of non-persistent data storage in other embodiments. The volatile memory devices of the volatile memory 320 are illustratively embodied as dynamic random-access memory (DRAM) devices, but may be embodied as other types of volatile memory devices and/or memory technologies capable of storing data while power is supplied to the volatile memory 320.

Figure 4:
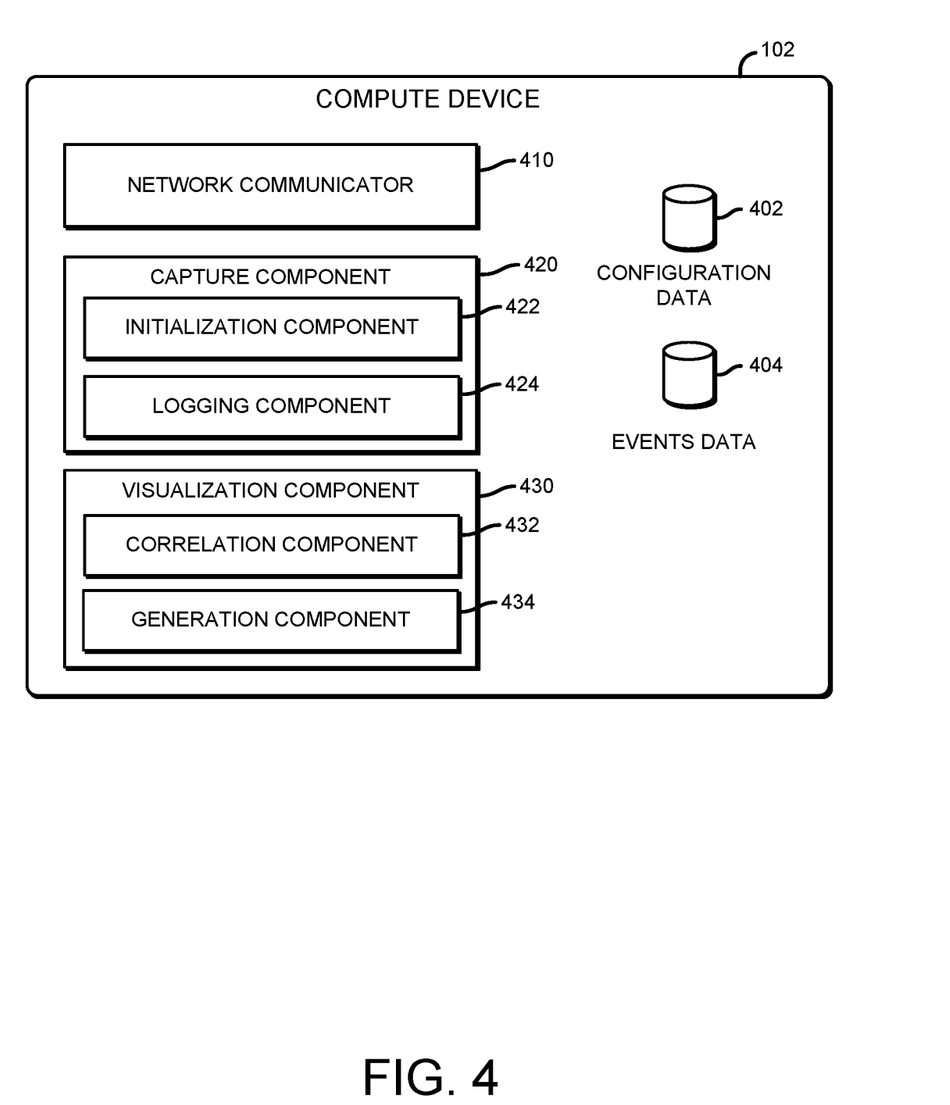
FIG. 4 is a simplified block diagram of at least one embodiment of an environment that may be established by the compute device described relative to FIG. 3.

Referring now to FIG. 4, the compute device 102 may establish an environment 400 during operation. The illustrative embodiment includes a network communicator 410, a capture component 420, and a visualization component 430. Each of the components of the environment 400 may be embodied as hardware, firmware, software, or a combination thereof. Further, in some embodiments, one or more of the components of the environment 400 may be embodied as circuitry or a collection of electrical devices (e.g., a network communicator circuitry 410, a capture component circuitry 420, and a visualization component circuitry 430, etc.). It should be appreciated that, in some embodiments, one or more of the network communicator circuitry 410, capture component circuitry 420, and visualization component circuitry 430 may form a portion of one or more of the NIC 212, compute engine 202, the communication circuitry 210, the I/O subsystem 208, and/or other components of the compute device 102. In the illustrative embodiment, the environment 400 also includes configuration data 402, which may be embodied as any data indicative of storage application layers in the data storage system and the data storage devices 108 for which to record information, and the like. The environment 400 also includes events data 404, which may be embodied as any data indicative of storage events recorded in the data storage subsystem. The events data 404 may be embodied, e.g., as a file that organizes events by layer (and/or data storage device 108) and time. Another example includes a local search structure to provide the events data 404, such as a hash table.

In the illustrative environment 400, the network communicator 410 which may be embodied as hardware, firmware, software, virtualized hardware, emulated architecture, and/or a combination thereof as discussed above, is configured to facilitate inbound and outbound network communications (e.g., storage I/O requests from the applications 112, etc.) to and from the compute device 102, respectively. To do so, the network communicator 410 is configured to prepare and send network frames to another network device. Accordingly, in some embodiments, at least a portion of the functionality of the network communicator 410 may be performed by the communication circuitry 210, and, in the illustrative embodiment, by the NIC 212.

In the illustrative embodiment, the capture component 420, which may be embodied as hardware, firmware, software, virtualized hardware, emulated architecture, and/or a combination thereof as discussed above, is configured to direct components in the data storage subsystem to record storage events, which may include storage operations (e.g., read/write accesses, erase operations, defragmentation operations, BDR operations, logical block address and physical block address mapping, and the like. To do so, the capture component 420 includes an initialization component 422 and a logging component 424.

The initialization component 422 is configured to send a discovery request to each participating storage application layer and device (e.g., specified in the configuration data 402). Note, a user (e.g., administrator) may specify which storage applications and devices to record (e.g., via the management console 120). The discovery request may include a time stamp to be used in time synchronization for recording. For example, the time stamp may include a current time or an amount of microseconds since a specified time. The discovery request also establishes functions used to query trace-chunks (e.g., a structure used to capture for a given time interval) from the storage application layer and device. For a given storage application layer, the discovery request may provide callback functions used to asynchronously record events. Doing so eliminates the need for the trace logic 106 to poll the storage application layer. For a given data storage device 108, the discovery request may also include a polling frequency to inform the data storage device 108 of specified intervals in which the trace logic 106 polls the data storage device 108 for storage event data.

The logging component 424 is configured to cause the storage application layers and the data storage devices 108 to record storage events data. For example, the logging component 424 may receive, via the network communicator 410, a request from a user (e.g., from the management console 120) to start recording storage events in the data storage subsystem. In response, the logging component 424 may send a request to each participating storage application layer and data storage device 108 to begin recording storage events data. The participating components (e.g., the initialized storage application layers and data storage devices 108) in the data storage subsystem may begin recording events, in which each event is associated with a time stamp that is determined as a function of the time stamp provided with the discovery request. Further, if a participating component supports asynchronous event reporting, the component may use the callback functions discussed previously to report the events to the logging component 424. In other cases, the participating component may maintain a first in first out (FIFO) queue structure for storing trace-chunks for periodic query by the logging component 424. For instance, the logging component 424 may poll the component (e.g., at an interval specified in the discovery request), and in turn, the component may send storage events by trace-chunk to the logging component 424. The trace-chunk may include storage events for a specified interval and timestamps for each interval.

The logging component 424, when receiving new storage events, may evaluate and log each storage event in turn. For instance, if a storage event is a standalone event (e.g., an error notification), the logging component 424 may log the event in a trace file of the events data 404. If the storage event corresponds to the component starting to record an event, then the logging component 424 stores the start in a local search structure in the events data 404, such as a hash table. If the storage event corresponds to the component ending the recording, then the logging component 424 may retrieve the corresponding record start event from the search structure and log the event with the start and finish timestamps in the trace file of the events data 404 with the start and finish time stamps in the trace file. In other cases, the logging component 424 may log the events as-is into the trace file. Doing so may be effective for matching offline start and finish records.

In the illustrative embodiment, the visualization component 430, which may be embodied as hardware, firmware, software, virtualized hardware, emulated architecture, and/or a combination thereof as discussed above, is configured to generate a visualization of the recorded events data 404, e.g., responsive to a request by the management console 120. To do so, the visualization component 430 includes a correlation component 432 and a generation component 434.

The correlation component 432 may determine one or more statistics from the events data 404. Example statistics may be on a per-layer basis, such as for a given storage application layer or an individual data storage device 108. Other example statistics may include correlative data between layers, such as across all or a group of data storage devices 108, a combination of storage application layers and data storage devices 108, and the like. Statistics may include a number of read and/or write operations associated with the layer at a given time period, a ratio of the number of write operations issued by an application to the number of physical writes to the media across all data storage layers, and the like. Advantageously, the correlation component 432 may determine statistics associated with storage application layers as related to internal operations in the data storage devices 108.

The generation component 434 may create, from the events data 404 and determined statistics, one or more visualizations to present, e.g., to a user (e.g., via the management console 120). To do so, the generation component 434 may evaluate the trace file, match start and finish events if necessary, and generate a specified visualization. For example, the generation component 434 may create an access-sequence chart displays events relative to time for specified data storage subsystem components. As another example, the generation component 434 may provide a full raw view that includes a filterable and sortable presentation of records from all storage application layers and devices. Doing so allows a user or process to identify step-by-step behaviors and underlying performance issues.

Further, the generation component 434 may generate multiple selectable views for a given visualization, in which a user can "zoom-in" to a particular period in time by the visualization to view additional statistics for that period of time. For instance, the selectable view may be represented by a bounded box spanning a window of time on the visualization. A user may select the view and receive additional and more granular statistics related to the selection. As an example, the generation component 434 may use recorded host logical block addressing and physical block addressing to calculate and show statistics related to write and read accesses. If zoomed in, the visualization may provide these accesses plotted relative to a given window of time.

It should be appreciated that each of the network communicator 410, capture component 420, and visualization component 430 (including the components described relative to each) may be separately embodied as hardware, firmware, software, virtualized hardware, emulated architecture, and/or a combination thereof. For example, the capture component 420 may be embodied as a hardware component, while the visualization component 430 is embodied as one or more virtualized hardware components or as some other combination of hardware, firmware, software, virtualized hardware, emulated architecture, and/or a combination thereof.

Figure 5:
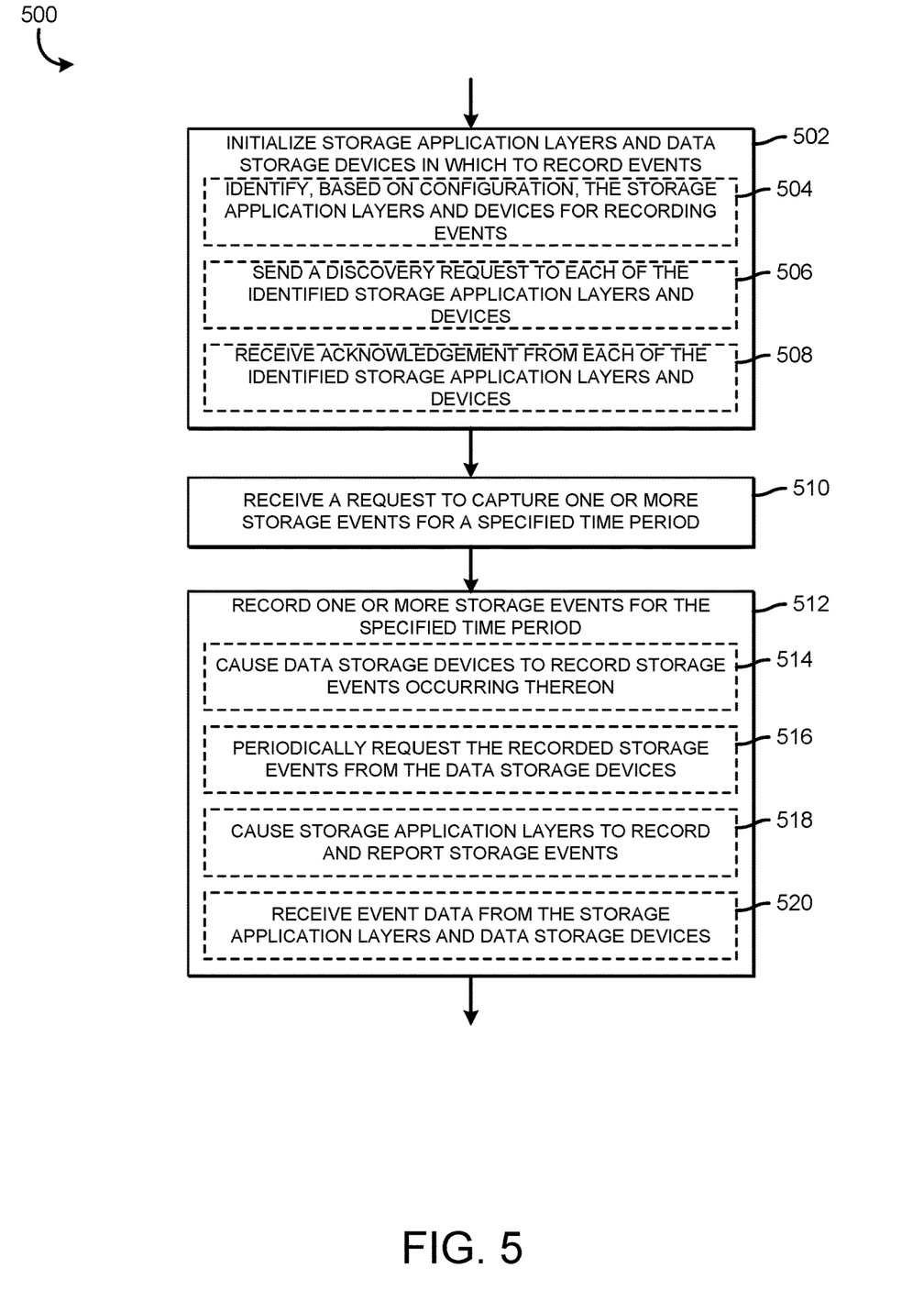
FIG. 5 is a simplified flow diagram of a method for capturing one or more events in a storage system.

Referring now to FIG. 5, the compute device 102 (e.g., via the trace logic 106), in operation, performs a method 500 for capturing storage events in a data storage subsystem that includes multiple storage application layers and data storage devices. As shown, the method 500 begins in block 502, in which the compute device 102 initializes a data storage subsystem including the storage application layers and data storage devices 108 for recording storage events. In some embodiments, the compute devices 102 initializes a subset of the storage application layers and data storage devices 108 (e.g., according to a predefined configuration). In block 504, the compute device 102 may initialize the data storage subsystem by identifying such predefined storage application layers and devices 108. The compute device 102 may do so based on a configuration, such as the configuration data 402. Further, in block 506, the compute device 102 sends a discovery request to each of the identified storage application layers and data storage devices. As noted, the discovery request may include a time stamp used to synchronize events across all of the participating layers as well as a specified polling frequency at which the compute device 102 may query the participating layers for recorded storage event data. In block 508, the compute device 102 receives an acknowledgement from each of the identified storage application layers and data storage devices. The acknowledgement may indicate that the participating component is initialized for recording storage events.

In block 510, the compute device 102 receives a request, e.g., from the management console 120 to capture one or more storage events for a specified time period. The request may include the time period at which to record the events (e.g., a specified time of day, immediate recording until instructed to end, etc.). The request may also include intervals at which to measure the recording of the storage events, e.g., five second intervals, five minute intervals, and the like.

In block 512, the compute device 102 records one or more storage events for the specified time period. For instance, to do so, in block 514, the compute device 102 causes the participating data storage devices 108 to record storage events occurring thereon (e.g., raw read and write accesses to memory). In block 516, the compute device 102 periodically requests the recorded storage events from the data storage devices 108. Further, in block 518, the compute device 102 causes each participating storage application layer to record and report storage events. In block 520, the compute device 102 receives the storage event data from the layers and the data storage devices 108. The compute device 102 may store the storage event data, e.g., in a trace file.

Figure 6:
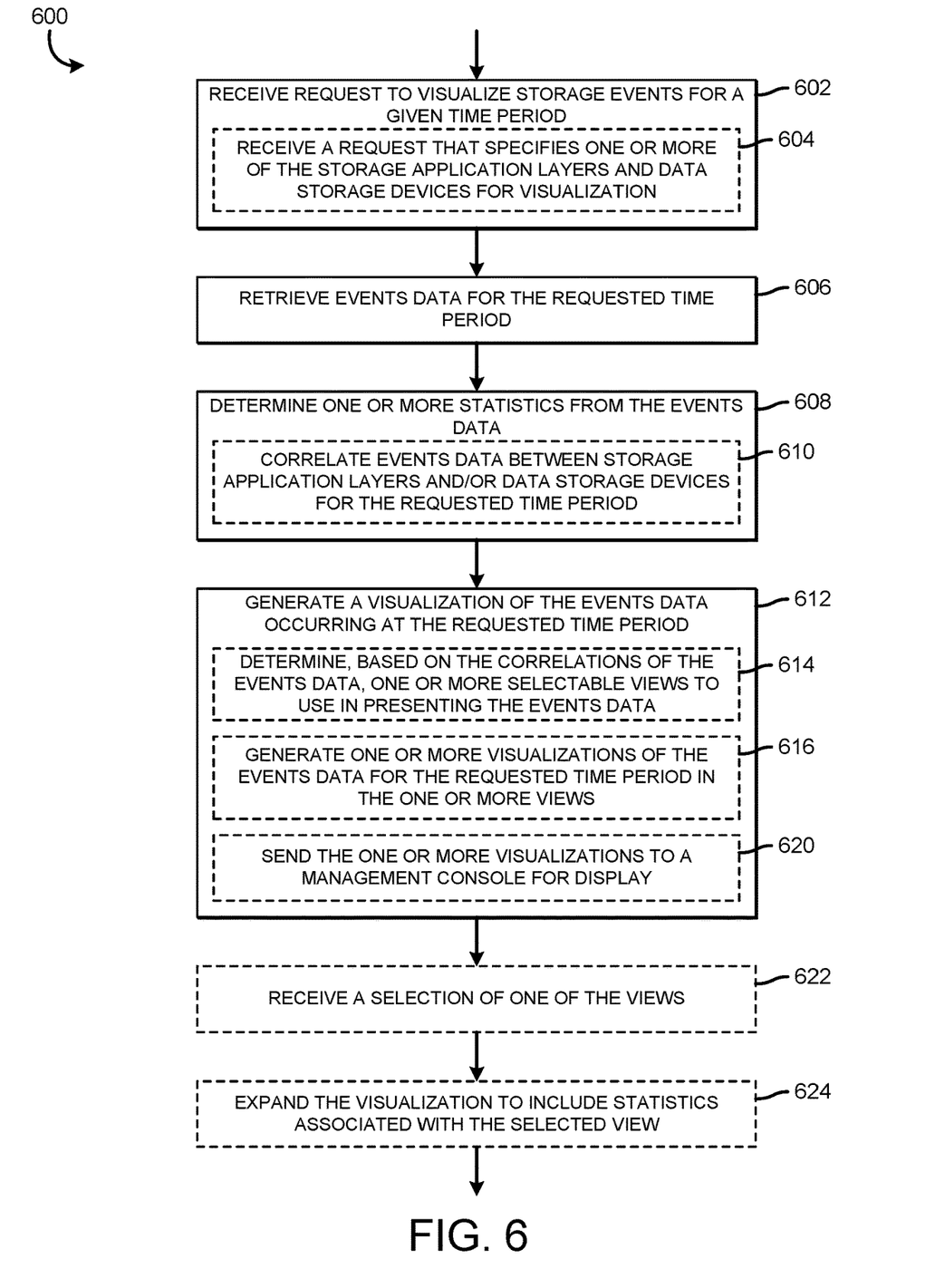
FIG. 6 is a simplified flow diagram of a method for visualizing one or more events in a storage system.

Referring now to FIG. 6, the compute device 102, in operation, performs a method 600 for visualizing the recorded storage events discussed above. As shown, the method 600 begins in block 602, in which the compute device 102 receives a request to visualize storage events for a given time period. For example, the management console 120 may send the request on behalf of an administrator or developer. As indicated in block 604, the compute device 102 may receive a request that specifies one or more storage application layers and data storage devices for visualization. In block 606, the compute device 102 retrieves storage events data for the requested time period. For example, to do so, the compute device 102 retrieves the trace file and identifies events for the time period relative to timestamps provided for each event.

In block 608, the compute device 102 determines one or more statistics from the retrieved storage events data. For example, in block 610, the compute device 102 correlates events data between the storage application layers and/or data storage devices associated with storage events for that requested time period. For example, the compute device 102 may identify an average I/O latency for all participating layers for a given application workload based on the storage accesses recorded from each layer.

In block 612, the compute device 102 generates a visualization of the storage events data occurring over that requested time period. For instance, in block 614, the compute device 102 determines, based on the correlations of the events data, one or more selectable views to use in presenting the events data. For example, the compute device 102 may determine the one or more selectable views based on the request received from the management console 120. The request may, for example, specify to provide an access sequence view of the storage events across all layers for that time period. As another example, the compute device 102 may also identify time windows within the specified time period that include a relatively large amount of storage events. The compute device 102 may determine additional views that present the storage events in a more granular fashion. In block 616, the compute device 102 generates one or more visualizations of the storage events in the determined one or more views. For instance, the compute device 102 may generate a visualization that embeds one or more additional views (e.g., the previously identified time windows) therein. In block 620, the compute device 102 sends the one or more visualizations to the requestor (e.g., the management console 120) for display.

In block 622, the compute device 102 may optionally receive a selection of one of the views. For example, a user may select one of the time windows to zoom in and receive additional data. Once selected, in block 624, the compute device 102 expands the visualization at the selected view to include the statistics associated with the selected view. In some embodiments, the view selection and expansion may be carried out by the management console 118 after the management console 118 receives the original visualization from the compute device 102.

In some embodiments, the compute device 102 may perform corrective actions in response to a given visualization or collection of storage events matching a reference visualization indicative of a predefined performance issue. For example, the compute device 102 may match a reference visualization associated with high I/O latency to a generated visualization. The compute device 102 may then identify data storage devices 108 associated with the high I/O latency (e.g., based on the reference visualization) and cause each data storage device 108 to adjust certain parameters therein to alleviate the performance issue.

Figure 7:
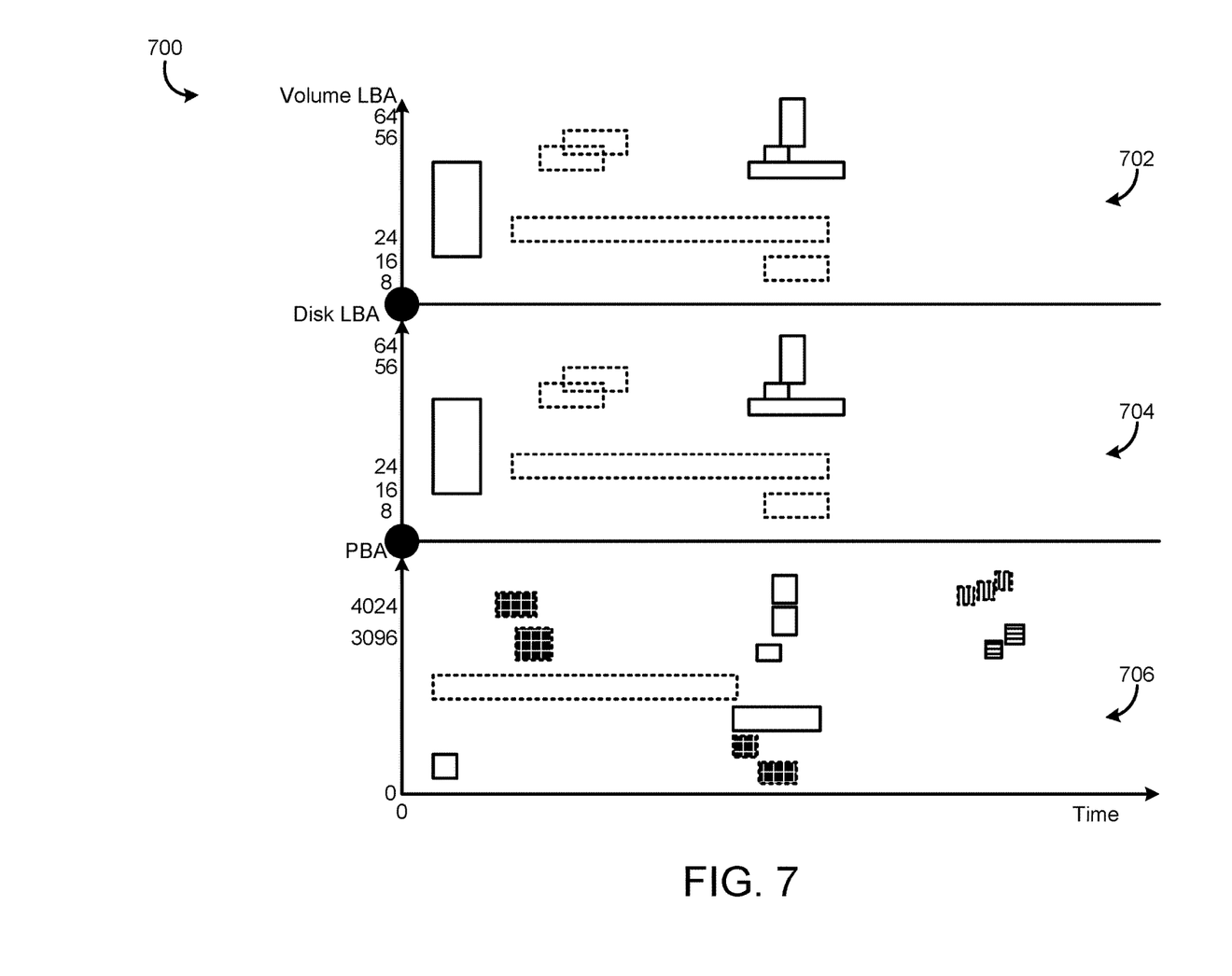
FIG. 7 is a simplified diagram of at least one embodiment of an example storage event visualization.

Referring now to FIG. 7, an example visualization 700 generated from captured storage events data is shown. More particularly, the visualization 700 provides a RAID pass-through example showing storage events relating to volume logical block addressing (LBA) 702, disk LBA 704, and PBA 706 as a function of time. Illustratively, each of represented storage events 702, 704, and 706 include a variety of bounded box rectangles. For the event 702, solid-line rectangles are indicative of write operations and dotted-line rectangles are indicative of read operations, each operation occurring at a volume level. For the event 704, solid-line rectangles are indicative of write operations and dotted-line rectangles are indicative of read operations at disk level. For the event 706, solid-line rectangles with no fill pattern are indicative of write operations, solid-line rectangles with horizontal fill patterns are indicative of background write operations, dotted-line rectangles with no filled pattern are indicative of erase operations, dotted-line rectangles with cross-hatch patterns are indicative of read operations, and dotted-line rectangles with vertical line patterns are indicative of background read operations, each operation occurring at PBA level.

A data storage device 108 may internally remap read and write operations according to a current state of the logical-to-physical mapping tables or flash translation layer thereof. The illustrated example depicts background operations occurring in parallel (e.g., erases, and defragmentation read and write operations). The disk-access view of 704 is extended to show operations at each level in the storage application layer. A user (or process) may determine that a QoS issue indicated by the relatively long read operation is likely associated with a pending erase operation at the NAND level.

Note, the trace logic 106 may be extended to include other intermediate layers, e.g., to display file system operations, object database operations, and the like. Doing so provides insight relating to background operations that may possibly cause performance issues. Further, the trace logic 106 may be extended to visualize other events and commands at any of the layers. For example, in the data storage device level, additional admin or moving read reference read operations may be logged and visualized. As another example, at disk level, the trace logic 106 may capture and visualize metadata read and write operations. Advantageously, the trace logic 106 provides a visualization of operations occurring concurrently at each level in the data storage subsystem. The visualization provides immediate insight into causes of performance issues.

Figure 8:
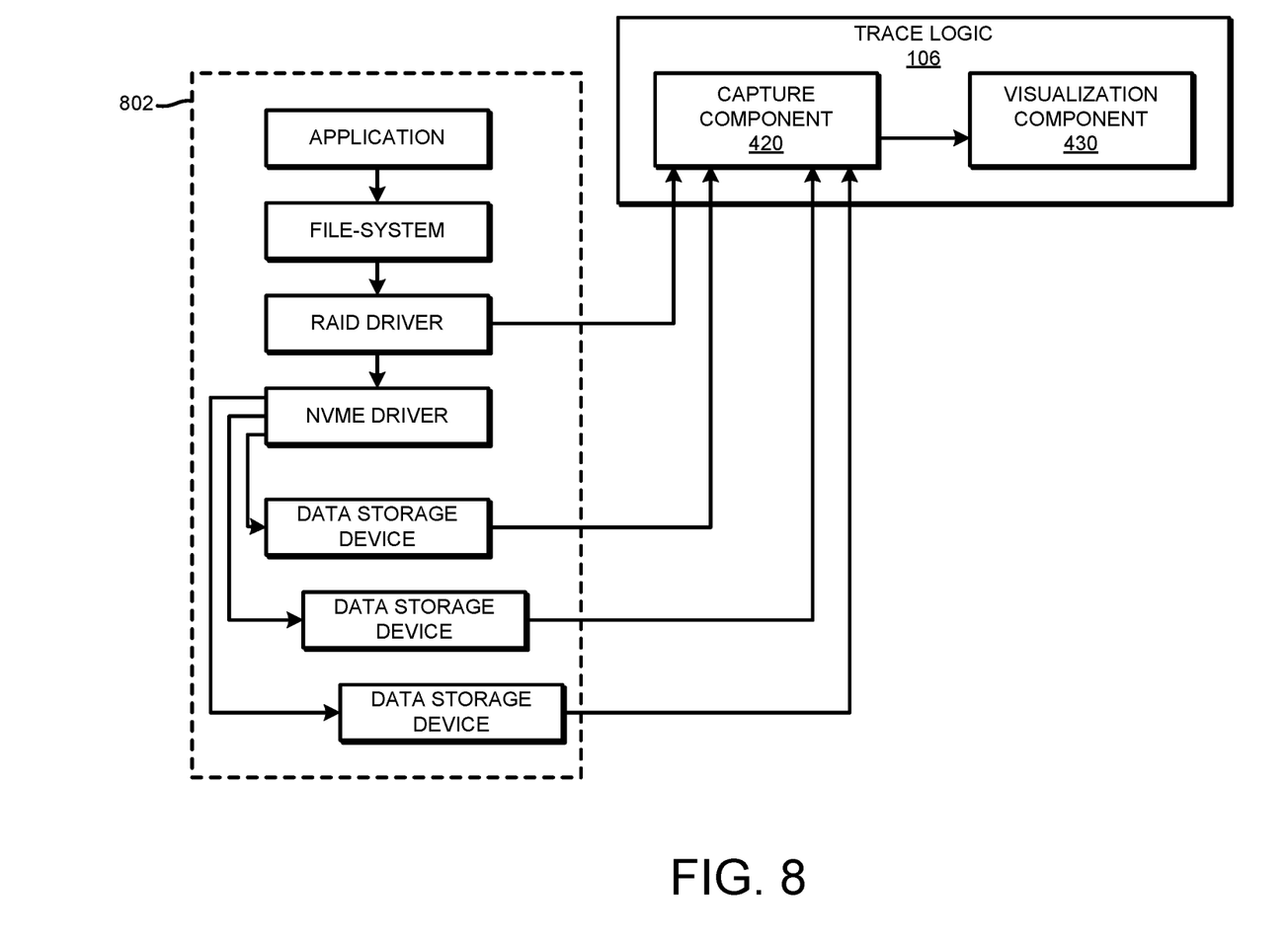
FIG. 8 is a simplified conceptual diagram of an example of at least one embodiment of various storage application layers capturing storage events.

Referring now to FIG. 8, an example of various storage application layers 802 in the compute device 102 capturing storage events is shown. More particularly, FIG. 8 depicts an example storage stack that enables logging of storage events from the storage application layers 802 and visualization of the storage events by the trace logic 106. Illustratively, the storage application layers 802 are arranged hierarchically, with an application (e.g., the applications $112_{1\text{-}3}$) as a top layer and data storage devices in a bottom layer. Intermediate layers include a file-system, RAID (Redundant Array of Independent Disks) driver and a Non-Volatile Memory Express (NVMe) driver. Of course, as stated in the foregoing description, the storage application layers 802 may include other layers.

In this example, the application performs read and write operations to a RAID volume of NVMe-based data storage devices. Further, the RAID driver, and the data storage devices have logging and visualization enabled. Further still, logging and visualization in the application, file-system, and NVMe driver are disabled. Here, the trace logic 106, e.g., via the capture component 420, collects storage events from the participating layers (e.g., the RAID driver and the data storage devices) and may store the storage events in a file. The trace logic may analyze the storage events in the captured layers in a time-synchronized manner. Further, the visualization component 430 may evaluate the file and the analysis to provide meaningful views for a user. For example, the visualization component 430 may provide views such as that portrayed in FIG. 7 for windowed throughput analysis and cross-layer QoS analysis.

EXAMPLES

Illustrative examples of the technologies disclosed herein are provided below. An embodiment of the technologies may include any one or more, and any combination of, the examples described below.

Example 1 includes an apparatus comprising a data storage subsystem having a plurality of storage application layers and one or more data storage devices, each data storage device to capture a first storage event thereon for a specified time period; a compute engine to capture a second storage event associated with one or more of the plurality of storage application layers for the specified time period; determine, from the captured first and second storage events, one or more statistics indicative of correlations between the plurality of storage application layers; and generate a visualization of the first and second storage events and the statistics for the specified time period.

Example 2 includes the subject matter of Example 1, and wherein the compute engine is further to initialize the plurality of storage application layers and the data storage devices to capture the first and second storage events.

Example 3 includes the subject matter of any of Examples 1 and 2, and wherein to initialize the plurality of storage application layers and the data storage devices comprises to send a discovery request to each of the storage application layers and the data storage devices, the discovery request including a timestamp to synchronize the first and second storage events and further including a specified polling frequency.

Example 4 includes the subject matter of any of Examples 1-3, and wherein to capture the first storage event thereon for the specified time period comprises to cause each of the data storage devices to record the first storage event occurring thereon.

Example 5 includes the subject matter of any of Examples 1-4, and wherein to capture the first storage event thereon for the specified time period further comprises to periodically request the recorded storage event from each of the data storage devices.

Example 6 includes the subject matter of any of Examples 1-5, and wherein to capture the second storage event associated with the plurality of application layers for the specified time period comprises to cause each of the storage application layers to record the second storage event occurring thereon.

Example 7 includes the subject matter of any of Examples 1-6, and wherein to determine, from the captured first and second storage events, the one or more statistics comprises to correlate the captured storage events between the storage application layers and the data storage devices for the specified time period.

Example 8 includes the subject matter of any of Examples 1-7, and wherein to generate a visualization of the first and second storage events and the statistics for the specified time period comprises to determine, based on the correlations of the captured first and second storage events, one or more selectable views; and generate the visualization including the one or more selectable views.

Example 9 includes the subject matter of any of Examples 1-8, and wherein the compute engine is further to receive a selection of one of the selectable views indicative of the specified time period; and expand the visualization to include one of the statistics associated with the selected view.

Example 10 includes the subject matter of any of Examples 1-9, and wherein the compute engine is further to determine whether the visualization matches a reference visualization indicative of a predefined performance issue; and perform, in response to a determination that the visualization matches the reference visualization, a corrective action to address the predefined performance issue.

Example 11 includes a computer-implemented method comprising capturing, by one or more processors, a first storage event and a second storage event in a data storage subsystem for a specified time period, the data storage subsystem including a plurality of storage application layers and one or more data storage devices, the first storage event being captured on one of the data storage devices and the second storage event being associated with one or more of the plurality of storage application layers; determining, from the captured first and second storage events, one or more statistics indicative of correlations between the plurality of storage application layers; and generating a visualization of the storage events and the statistics for the specified time period.

Example 12 includes the subject matter of Example 11, and further including initializing the plurality of storage application layers and the data storage devices to capture the first and second storage events.

Example 13 includes the subject matter of any of Examples 11 and 12, and wherein initializing the plurality of storage application layers and the data storage devices comprises sending a discovery request to each of the storage application layers and the data storage devices, the discovery request including a timestamp to synchronize the first and second storage events and further including a specified polling frequency.

Example 14 includes the subject matter of any of Examples 11-13, and wherein capturing the first and second storage events in data storage subsystem for the specified time period comprises causing each of the data storage devices to record the first storage event occurring thereon; and periodically requesting the recorded first storage event from each of the data storage devices.

Example 15 includes the subject matter of any of Examples 11-14, and wherein capturing the first and second storage events in data storage subsystem for the specified time period comprises causing each of the storage applications to record the second storage event occurring thereon.

Example 16 includes the subject matter of any of Examples 11-15, and wherein determining, from the captured first and second storage events, the one or more statistics comprises correlating the captured first and second storage events between the storage application layers and the data storage devices for the specified time period.

Example 17 includes the subject matter of any of Examples 11-16, and wherein generating a visualization of the first and second storage events and the statistics for the specified time period comprises determining, based on the correlations of the captured storage events, one or more selectable views; and generating the visualization including the one or more selectable views.

Example 18 includes the subject matter of any of Examples 11-17, and further including receiving a selection of one of the selectable views indicative of the specified time period; and expanding the visualization to include one of the statistics associated with the selected view.

Example 19 includes the subject matter of any of Examples 11-18, and further including determining whether the visualization matches a reference visualization indicative of a predefined performance issue; and performing, in response to a determination that the visualization matches the reference visualization, a corrective action to address the predefined performance issue.

Example 20 includes a compute device, comprising a data storage subsystem having a plurality of storage application layers and one or more data storage devices, each data storage device to capture a first storage event thereon for a specified time period; circuitry for capturing a second storage event associated with one or more of the plurality of application layers for a specified time period; means for determining, from the captured first and second storage events, one or more statistics indicative of correlations between the plurality of application layers; and means for generating a visualization of the first and second storage events and the statistics for the specified time period.

The invention claimed is:

1. An apparatus comprising:
an I/O subsystem to:
receive a first storage event captured by a data storage device for a time period, wherein the first storage event includes a storage operation, and
receive a second storage event captured by one or more of a plurality of storage application layers for the time period, wherein the second storage event includes a storage operation; and
a processor to:
initialize the plurality of storage application layers and the data storage device, including to send a discovery request to each of the storage application layers and the data storage device, the discovery request including a specified polling frequency and a timestamp to synchronize the first and second storage events;
correlate the first storage event captured by the data storage device with the second storage event captured by one or more of the plurality of storage application layers for the time period,
determine an average I/O latency for participating layers for a given application workload based on storage accesses recorded from each of the participating layers during the time period, wherein the participating layers include the one or more storage application layers and the data storage device;
generate a visualization of the correlated first and second storage events for the time period and associated statistics, the associated statistics including the I/O latency for the participating layers; and
perform, in response to the generated visualization matching a reference visualization associated with a performance issue, a corrective action to handle the performance issue.

2. The apparatus of claim 1, wherein the processor is to cause the data storage device to record the first storage event occurring thereon.

3. The apparatus of claim 2, wherein the processor is to periodically request the recorded storage event from the data storage device.

4. The apparatus of claim 1, wherein the processor is to cause each of the storage application layers to record the second storage event occurring thereon.

5. The apparatus of claim 1, wherein to generate a visualization of the correlated first and second storage events comprises to:
determine, based on the correlations of the captured first and second storage events, one or more selectable views; and
generate the visualization including the one or more selectable views.

6. The apparatus of claim 5, wherein the processor is further to:
receive a selection of one of the selectable views indicative of the time period; and
expand the visualization to include statistics associated with the selected view.

7. A computer-implemented method comprising:
capturing, by one or more processors, a first storage event and a second storage event in a data storage subsystem for a time period, the data storage subsystem including a plurality of storage application layers and one or more data storage devices, the first storage event being captured on one of the data storage devices and the second storage event being captured by one or more of the plurality of storage application layers, wherein the first storage event and the second storage event include storage operations;
initializing the plurality of storage application layers and the data storage device, including sending a discovery request to each of the storage application layers and the data storage device, the discovery request including a specified polling frequency and a timestamp to synchronize the first and second storage events;
correlating the first storage event captured by each data storage device with the second storage event captured by one or more of the plurality of storage application layers for the time period
determining an average I/O latency for participating layers for a given application workload based on storage accesses recorded from each of the participating layers during the time period, wherein the participating layers include the one or more storage application layers and the data storage device;
generating a visualization of the correlated storage events for the specified time period; and
performing, in response to the generated visualization matching a reference visualization associated with a performance issue, a corrective action to handle the performance issue.

8. The computer-implemented method of claim 7, wherein capturing the first and second storage events in data storage subsystem for the time period comprises:
causing one of the data storage devices to record the first storage event occurring thereon; and
periodically requesting the recorded first storage event from one of the data storage devices.

9. The computer-implemented method of claim 7, wherein capturing the first and second storage events in data storage subsystem for the time period comprises causing each of the one or more storage application layers to record the second storage event occurring thereon.

10. The computer-implemented method of claim 7, wherein generating a visualization of the first and second storage events comprises:
determining, based on the correlations of the captured storage events, one or more selectable views; and
generating the visualization including the one or more selectable views.

11. The computer-implemented method of claim 10, further comprising:
receiving a selection of one of the selectable views indicative of the time period; and
expanding the visualization to include statistics associated with the selected view.

12. The computer-implemented method of claim 7, wherein:
the first storage event includes an internally generated storage operation in the data storage device during the time period; and
the second storage event includes a host-triggered storage operation during the time period from one or more of the plurality of storage application layers.

13. A compute device, comprising:
a data storage subsystem having a plurality of storage application layers a data storage device, the data storage device to capture a first storage event thereon for a time period, wherein the first storage event includes a storage operation;
means for initializing the plurality of storage application layers and the data storage device, including sending a discovery request to each of the storage application layers and the data storage device, the discovery request including a specified polling frequency and a timestamp to synchronize the first and second storage events;
  means for capturing a second storage event by one or more of the plurality of storage application layers for a time period, wherein the second storage event includes a storage operation;
  means for correlating the first storage event captured by the data storage device with the second storage event captured by one or more of the plurality of storage application layers for the time period;
  means for determining an average I/O latency for participating layers for a given application workload based on storage accesses recorded from each of the participating layers during the time period, wherein the participating layers include the one or more storage application layers and the data storage device;
  means for generating a visualization of the correlated first and second storage events for the time period; and
  means for performing, in response to the generated visualization matching a reference visualization associated with a performance issue, a corrective action to handle the performance issue.

14. The apparatus of claim 1, wherein:
  the first storage event includes an internally generated storage operation in the data storage device during the time period; and
  the second storage event includes a host-triggered storage operation during the time period from one or more of the plurality of storage application layers.

15. The compute device of claim 13, further comprising:
  means to cause the data storage device to record the first storage event occurring thereon.

16. The compute device of claim 15, further comprising:
  means to periodically request the recorded storage event from the data storage device.

17. The compute device of claim 13, further comprising:
  means for causing each of the storage application layers to record the second storage event occurring thereon.

18. The compute device of claim 13, wherein to generating a visualization of the correlated first and second storage events comprises:
  determining, based on the correlations of the captured first and second storage events, one or more selectable views; and
  generating the visualization including the one or more selectable views.

19. The compute device of claim 18, further comprising:
  means for receiving a selection of one of the selectable views indicative of the time period; and
  means for expanding the visualization to include statistics associated with the selected view.

20. The compute device of claim 13, wherein:
  the first storage event includes an internally generated storage operation in the data storage device during the time period; and
  the second storage event includes a host-triggered storage operation during the time period from one or more of the plurality of storage application layers.

* * * * *